United States Patent
Osako et al.

(10) Patent No.: US 7,326,910 B2
(45) Date of Patent: Feb. 5, 2008

(54) MULTIPLE-OPTICAL-AXIS PHOTOELECTRIC SENSOR

(75) Inventors: Kazunori Osako, Fukuchiyama (JP);
Tetsuya Akagi, Fukuchiyama (JP);
Taku Yamamoto, Fukuchiyama (JP)

(73) Assignee: Omron Corporation, Kyoto-Shi (JP)

( * ) Notice: Subject to any disclaimer, the term of this patent is extended or adjusted under 35 U.S.C. 154(b) by 95 days.

(21) Appl. No.: 11/236,880

(22) Filed: Sep. 28, 2005

(65) Prior Publication Data

US 2006/0071154 A1  Apr. 6, 2006

(30) Foreign Application Priority Data

Sep. 30, 2004  (JP) .............. 2004-287175

(51) Int. Cl.
*H01J 40/14* (2006.01)
*G08B 13/18* (2006.01)

(52) U.S. Cl. .............. 250/221; 250/222.1; 340/555; 340/556

(58) Field of Classification Search ........ 250/221, 250/222.1, 216, 208.3, 208.4; 340/689, 555, 340/556, 557; 356/152.1, 153
See application file for complete search history.

(56) References Cited

U.S. PATENT DOCUMENTS

| | | | | |
|---|---|---|---|---|
| 5,567,931 A | * | 10/1996 | Amend et al. ........... | 250/221 |
| 5,801,376 A | | 9/1998 | Haberl et al. | |
| 6,370,439 B1 | * | 4/2002 | Geiler et al. ........... | 700/83 |
| 6,624,751 B2 | | 9/2003 | Haberer et al. | |
| 2006/0033013 A1 | * | 2/2006 | Pustelniak ........... | 250/221 |

FOREIGN PATENT DOCUMENTS

| | | |
|---|---|---|
| DE | 195 10 304 | 2/1996 |
| DE | 196 11 195 | 6/1997 |
| DE | 196 13 940 | 10/1997 |
| DE | 297 14 438 | 10/1997 |
| DE | 299 00 149 | 3/1999 |
| DE | 100 39 142 | 2/2002 |
| DE | 100 38 025 | 3/2002 |
| DE | 100 46 136 | 4/2002 |
| JP | 2002-217703 A | 8/2002 |

* cited by examiner

*Primary Examiner*—Georgia Epps
*Assistant Examiner*—Don Williams
(74) *Attorney, Agent, or Firm*—Foley & Lardner LLP

(57) ABSTRACT

The present invention provides a multiple-optical-axis photoelectric sensor in which an error in detection of an object caused by disturbance light is prevented easily and efficiently by adjusting a light projection/reception cycle in accordance with a state where mutual interference is recognized. In the invention, by detecting a range in which mutual interference occurs, that is, the position in which disturbance light is detected, which is either a first-half period or a latter-half period of a whole light projecting/receiving operation period, whether the phase is advanced or delayed is determined. For a period according to the position of the optical axis in which incidence of disturbance light is recognized or the number of optical axes in which incidence of disturbance light is recognized continuously, a scheduled next sync timing is changed.

20 Claims, 12 Drawing Sheets

MULTIPLE-OPTICAL-AXIS PHOTOELECTRIC SENSOR

BACKGROUND OF THE INVENTION

1. Field of the Invention

The present invention relates to a multiple-optical-axis photoelectric sensor in which an object detection area of multiple optical axes is formed by a plurality of light projecting elements constructing a projector and a plurality of light receiving elements constructing a photodetector. More particularly, the present invention relates to a multiple-optical-axis photoelectric sensor taking the measure against mutual interference.

2. Description of the Related Art

Generally, a multiple-optical-axis photoelectric sensor includes, as shown in FIG. 12, a projector 1A in which a plurality of light projecting elements 3A are aligned in line and a photodetector 2A in which a plurality of light receiving elements 4A paired with the light projecting elements 3A are aligned in line.

The projector 1A and the photodetector 2A are disposed with a proper distance so that the light projecting element 3A and the light receiving element 4A in a pair face each other in a one-to-one manner. The optical axis (shown by an alternate long and short dash line in the diagram) connecting the light projecting element 3A and the light receiving element 4A in a pair are parallel with each other. Between the projector 1A and the photodetector 2A, a two-dimensional object detection area S for detecting the presence or absence of an object is formed by a number of parallel optical axes.

Generally, a light emitting diode is used as the light projecting element, and a photodiode is used as the light receiving element. Each of the light projecting elements is allowed to perform light emitting operation at least once. To shorten time required to determine the presence or absence of an object, each of the light projecting elements can be allowed to perform the light emitting operation a plurality of times in a row.

Since the multiple-optical-axis photoelectric sensor of this kind can detect the presence or absence of an object in the object detection area S, it is used for, for example, a safety device of a pressing machine and the like. When a human body enters a dangerous area in the pressing machine, any of the optical axes is blocked by the human body (light shield state). When one or more optical axes in the light shield state exists, an object detection signal is set to the high level and an output is given to a controller of the pressing machine to urgently stop the operation of the pressing machine.

A failure in detection of an object by the multiple-optical-axis photoelectric sensor can cause a physical injury and it is very dangerous. One of factors of inducing a failure in detection of an object is disturbance light. When disturbance light enters the light receiving element of any of the optical axes blocked by the human body, the light shield state is not obtained, and the object detection signal is not set to the high level.

FIG. 13 is a diagram illustrating an installation example of a plurality of multiple-optical-axis photoelectric sensors A and B.

Referring to FIG. 13, to the photodetector 2A of the first multiple-optical-axis photoelectric sensor A, not only detection light "a" from the projector 1A but also detection light "b" from a projector 1B of the second multiple-optical-axis photoelectric sensor B as disturbance light is incident. In such a case, even if any of the optical axes is blocked by the human body in the first multiple-optical-axis photoelectric sensor A, if the detection light "b" of the second multiple-optical-axis photoelectric sensor B is incident as disturbance light on the light receiving element of the optical axis, the light shield state is not obtained. In the diagram, a photodetector 2B is shown in correspondence with the projector 1B of the second multiple-optical-axis photoelectric sensor B.

There are cases such that a plurality of multiple-optical-axis photoelectric sensors as described above are mounted close to each other in a site. In such cases, it is feared that so-called mutual interference occurs. In these days, various multiple-optical-axis photoelectric sensors taking the measure against such mutual interference are proposed.

For example, Japanese Patent Laid-Open No. 2002-217703 discloses a multiple-optical-axis photoelectric sensor in which disturbance light synchronized with a timing of light generating operation of each light projecting element is detected around the timing of light generating operation of the light projecting element. When disturbance light is detected, the timing of the light generating operation of the light projecting element is shifted, thereby preventing a failure in detection of an object caused by the disturbance light synchronized with the timing of the light generating operation of the light projecting element.

However, shifting of the timing of the light generating operation of each light projecting element, that is, the light projection/reception cycle disclosed in the publication is advancing or delaying of the timing for a predetermined period.

In some cases, the timing has to be shifted a plurality of times in order to be adjusted to a proper timing, and a failure in detection may occur during the time of shifting. That is, desirably, it is proper to adjust the light projection/reception cycle in accordance with a state where mutual interference is detected.

SUMMARY OF THE INVENTION

The present invention has been achieved to solve such a problem and an object of the invention is to provide a multiple-optical-axis photoelectric sensor in which a failure in detection of an object caused by disturbance light is prevented simply and efficiently by adjusting a light projection/reception cycle in accordance with a state where mutual interference is recognized.

The invention provides a multiple-optical-axis photoelectric sensor having a light-projection sensor head in which a plurality of projectors are arranged and a light-reception sensor head in which a plurality of photodetectors are arranged, and performing light projecting/receiving operation while sequentially synchronizing light projection/reception periods from one end to the other end of the projectors and the photodetectors arranged in optical axes in predetermined cycles to monitor the presence or absence of invasion of an object to a predetermined area on the basis of detection light, including: a disturbance light presence/absence determining device that determines whether disturbance light is incident or not by performing reception light sampling in which only reception of light is performed in at least one of a period immediately after the light projection/reception period and a period immediately before the light projection/reception period every optical axis; a light incident state determining device that determines an incident state of the disturbance light in the light-reception sensor head, determined by the disturbance light presence/absence determining device; and a cycle changing device that shifts the phase of the following cycle by changing a scheduled next sync timing in accordance with the position of an optical axis in which incidence of the disturbance light is determined by the light incident state determining device.

The invention provides another multiple-optical-axis photoelectric sensor having a light-projection sensor head in which a plurality of projectors are arranged and a light-reception sensor head in which a plurality of photodetectors are arranged, and performing light projecting/receiving operation while sequentially synchronizing light projection/reception periods from one end to the other end of the projectors and the photodetectors arranged in optical axes in predetermined cycles to monitor the presence or absence of invasion of an object to a predetermined area on the basis of detection light, including: a disturbance light presence/absence determining device that determines whether disturbance light is incident or not by performing reception light sampling in which only reception of light is performed in at least one of a period immediately after the light projection/reception period and a period immediately before the light projection/reception period every optical axis; a light incident state determining device that determines an incident state of the disturbance light in the light-reception sensor head, determined by the disturbance light presence/absence determining device; and a cycle changing device that shifts the phase of the following cycle by changing start of a scheduled next sync timing in accordance with the number of optical axes in which incidence of the disturbance light is determined in a row by the light incident state determining device.

The invention provides a further another multiple-optical-axis photoelectric sensor having a light-projection sensor head in which a plurality of projectors are arranged and a light-reception sensor head in which a plurality of photodetectors are arranged, and performing light projecting/receiving operation while sequentially synchronizing light projection/reception periods from one end to the other end of the projectors and the photodetectors arranged in optical axes in predetermined cycles to monitor the presence or absence of invasion of an object to a predetermined area on the basis of detection light, including: a disturbance light presence/absence determining device that determines whether disturbance light is incident or not by performing reception light sampling in which only reception of light is sequentially performed from one end to the other end of the projectors and photodetectors arranged in a period corresponding to a light projection/reception period of the cycle every optical axis once per plural times of the predetermined cycle; a light incident state determining device that determines an incident state of the disturbance light in the light-reception sensor head, determined by the disturbance light presence/absence determining device every optical axis; and a cycle changing device that shifts the phase of the following cycle by changing a scheduled next sync timing in accordance with the position of an optical axis in which incidence of the disturbance light is determined by the light incident state determining device.

The invention provides a further another multiple-optical-axis photoelectric sensor having a light-projection sensor head in which a plurality of projectors are arranged and a light-reception sensor head in which a plurality of photodetectors are arranged, and performing light projecting/receiving operation while sequentially synchronizing light projection/reception periods from one end to the other end of the projectors and the photodetectors arranged in optical axes in predetermined cycles to monitor the presence or absence of invasion of an object to a predetermined area on the basis of detection light, including: a disturbance light presence/absence determining device that determines whether disturbance light is incident or not by performing reception light sampling in which only reception of light is sequentially performed from one end to the other end of the projectors and photodetectors arranged in a period corresponding to a light projection/reception period of the cycle every optical axis once per plural times of the predetermined cycle; a light incident state determining device that determines an incident state of the disturbance light in the light-reception sensor head every optical axis, determined by the disturbance light presence/absence determining device; and a cycle changing device that shifts the phase of the following cycle by changing start of a scheduled next sync timing in a period according to the number of optical axes in which incidence of the disturbance light is determined in a row by the light incident state determining device.

The invention provides a further another multiple-optical-axis photoelectric sensor having a light-projection sensor head in which a plurality of projectors are arranged and a light-reception sensor head in which a plurality of photodetectors are arranged, and performing light projecting/receiving operation while sequentially synchronizing light projection/reception periods from one end to the other end of the projectors and the photodetectors arranged in optical axes in predetermined cycles to monitor the presence or absence of invasion of an object to a predetermined area on the basis of detection light, including: a disturbance light presence/absence determining device that determines whether disturbance light is incident or not by performing reception light sampling in which only reception of light is performed in at least one of a period immediately after the light projection/reception period and a period immediately before the light projection/reception period every optical axis; a light incident state determining device that determines an incident state of the disturbance light in the light-reception sensor head every optical axis, determined by the disturbance light presence/absence determining device; and a cycle changing device that delays the scheduled next sync timing when the incident state of the disturbance light is recognized in a first-half period of a whole period in which the incident state of the disturbance light is determined on all of optical axes sequentially subjected to the reception light sampling by the light incident state determining device, and advances the scheduled next sync timing when the incident state of the disturbance light is recognized in a latter-half period of the whole period.

Particularly, the first-half period is divided into a first sub-first-half period and a second sub-second-half period subsequent to the first sub-first-half period, the cycle changing device delays the scheduled next sync timing by a first timing period from a predetermined period when the incident state of the disturbance light is recognized in the first sub-first-half period by the incident state determining device, and delays the scheduled next sync timing by a second timing period longer than the first timing period from the predetermined period when the incident state of the disturbance light is recognized in the first and second sub-first-half periods, the latter-half period is divided into a first sub-latter-half period and a second sub-latter-half period subsequent to the first sub-latter-half period, and the cycle changing device advances the scheduled next sync timing by a third timing period from the predetermined period when the incident state of the disturbance light is recognized in the second sub-latter-half period by the incident state determining device, and advances the scheduled next sync timing by a fourth timing period longer than the third timing period from the predetermined period when the incident state of the disturbance light is recognized in the first and second sub-latter-half periods.

Particularly, the cycle changing device advances the scheduled next sync timing by a fifth timing period longer than the fourth timing period from the predetermined period when the incident state of the disturbance light is recognized in the second sub-first-half period and the first and second sub-latter-half periods by the incident state determining device, and delays the scheduled next sync timing by a sixth timing period longer than the second timing period from the predetermined period when the incident state of the disturbance light is recognized in the first and second sub-first-half periods and the first sub-latter-half period.

Particularly, the larger the number of optical axes in which incidence of the disturbance light is continuously detected by the incident state determining device is, the more the cycle changing device increases a period for changing start of the scheduled next sync timing.

Preferably, sequential light projecting operations in the optical axes in the light projection/reception period are stopped once every predetermined plural cycles and, when shielding of light is detected in the light projection/reception period for at least two cycles in a row except for the cycle in which the light projecting operation is stopped, a signal for stopping operation of an external control device is output.

Preferably, when shielding of light is detected in the light projection/reception period for at least two cycles in a row except for the cycle in which reception light sampling of performing only light reception is performed, a signal for stopping operation of an external control device is output.

In particular, the number of plural cycles is set to a random number in unit of the plural cycles.

The invention provides a further another multiple-optical-axis photoelectric sensor including: a light-projection sensor head in which a plurality of projectors are arranged; a light-reception sensor head in which a plurality of photodetectors are arranged; and a monitoring device that performs light projecting/receiving operation while synchronizing light projection/reception periods in optical axes and monitors the presence or absence of invasion of an object to a predetermined area on the basis of detection light in a predetermined cycle, wherein the monitoring device stops light projecting operation once every predetermined plural cycles, the number of plural cycles is set to a random number in unit of the plural cycles, and when shielding of light is detected in the light projection/reception period for at least two cycles in a row except for the cycle in which light projecting operation is stopped, the monitoring device outputs a signal for stopping operation of an external control device.

Preferably, the sensor serves as a light curtain that generates a signal for stopping operation of an external control device when invasion of an object to the predetermined area is detected.

Preferably, the sensor serves as an area sensor that detects a position of invasion of an object in the predetermined area on the basis of at least one optical axis in which shielding of light is detected.

The multiple-optical-axis sensor according to the invention has a cycle changing device which shifts the phase of the following cycle by changing the scheduled next sync timing for a period according to the position of an optical axis in which incidence of disturbance light is detected by the incident state determining device or the number of optical axes in which incidence of disturbance light is continuously detected. That is, by adjusting the light projection/reception cycle in accordance with a state where mutual interference is detected, a failure in detection of an object caused by disturbance light can be prevented easily and efficiently.

DESCRIPTION OF THE PREFERRED EMBODIMENTS

Figure 1:
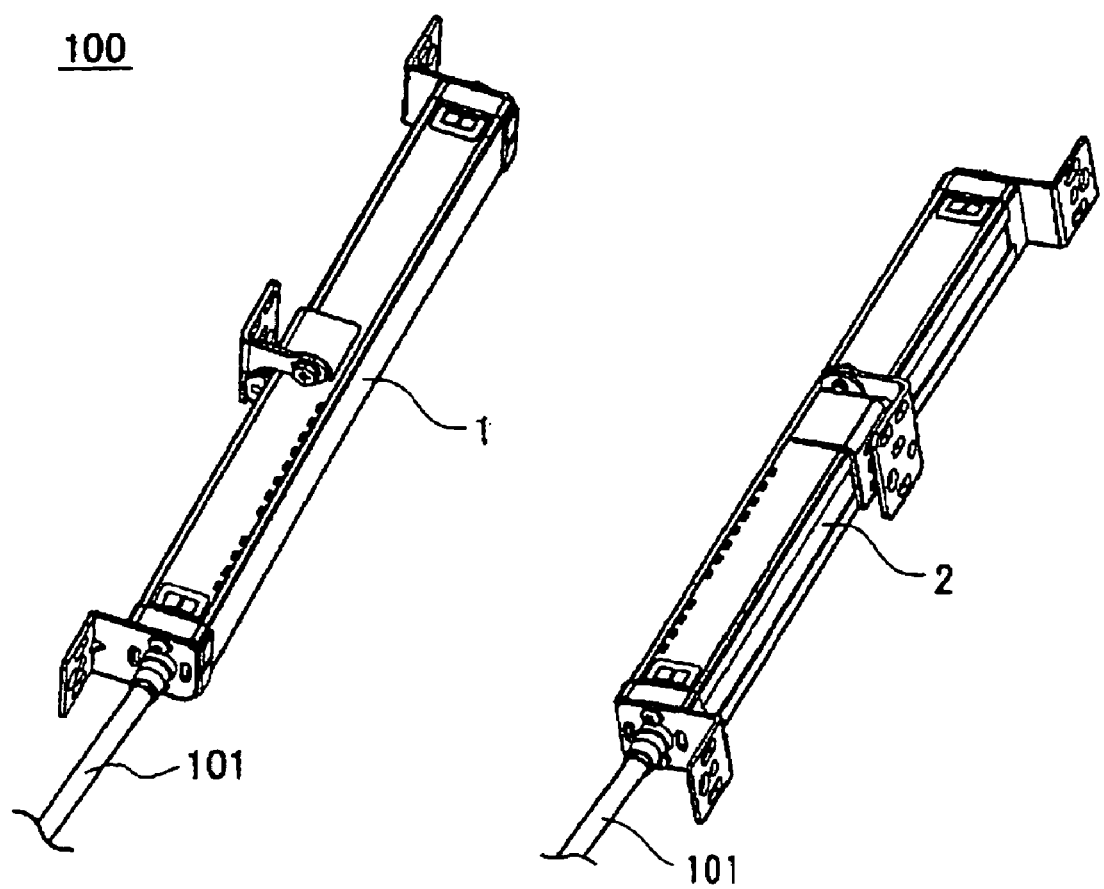
FIG. 1 shows a configuration diagram showing the appearance of a multiple-optical-axis photoelectric sensor according to a first embodiment of the invention.

Embodiments of the invention will be described in detail hereinbelow with reference to the drawings. In the drawings, the same reference numeral is given to the same or corresponding parts and its description will be given only once.

First Embodiment

FIG. 1 is a configuration diagram showing the appearance of a multiple-optical-axis photoelectric sensor according to a first embodiment of the invention.

Referring to FIG. 1, a multiple-optical-axis photoelectric sensor 100 according to the embodiment of the invention includes a light projection sensor head 1, a light reception sensor head 2, and a communication cable 101 used for transmission/reception. Although not shown, the light projection sensor head 1 and the light reception sensor head 2 are connected to an external setting device, a high-order device, and the like via the communication cable 101 so that various processes are executed.

Figure 2:
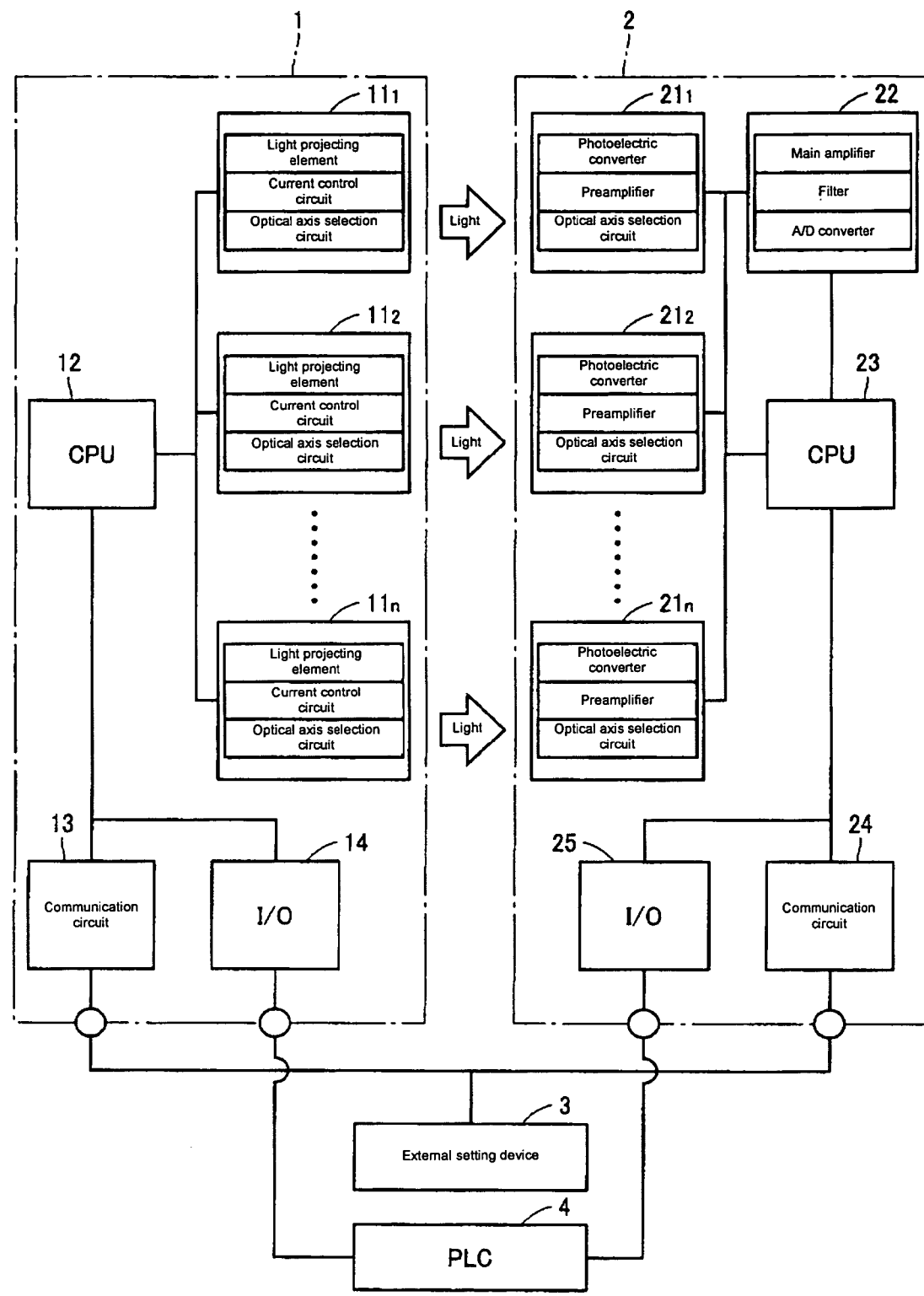
FIG. 2 shows a schematic block diagram of the body of the multiple-optical-axis photoelectric sensor according to the first embodiment of the invention.

FIG. 2 is a schematic block diagram of the body (sensor head) of the multiple-optical-axis photoelectric sensor according to the first embodiment of the invention.

Referring to FIG. 2, the light projection sensor head 1 includes: n pieces of projectors 11 ($11_1$ to $11_n$) each constructed by a light projecting element, a current control circuit, and an optical axis selection circuit, a CPU 12 for generating drive signals for the projectors 11 and the like, a communication circuit 13 for performing communication with the light reception sensor head 2 and communication with an external setting device 3, and an I/O interface 14 for performing communication with a high-order device (PLC in the embodiment).

The light reception sensor head 2 includes: photodetectors 21 ($21_1$ to $21_n$) each constructed by a photoelectric converter having light receiving elements, a preamplifier for amplifying a light reception signal from the light receiving elements, and an optical axis selection circuit; a signal processor 22 constructed by a main amplifier, a filter (comb filter), and an A/D converter, a CPU 23 that generates a drive signal for the photodetectors 21 and performs computation for detection determination on the basis of a signal from the signal processor 22, a communication circuit 24 for performing communication with the light projection sensor head 1 and communication with the external setting device 3, and an I/O interface 25 for performing communication with a high-order device (PLC in the embodiment).

Figure 3:
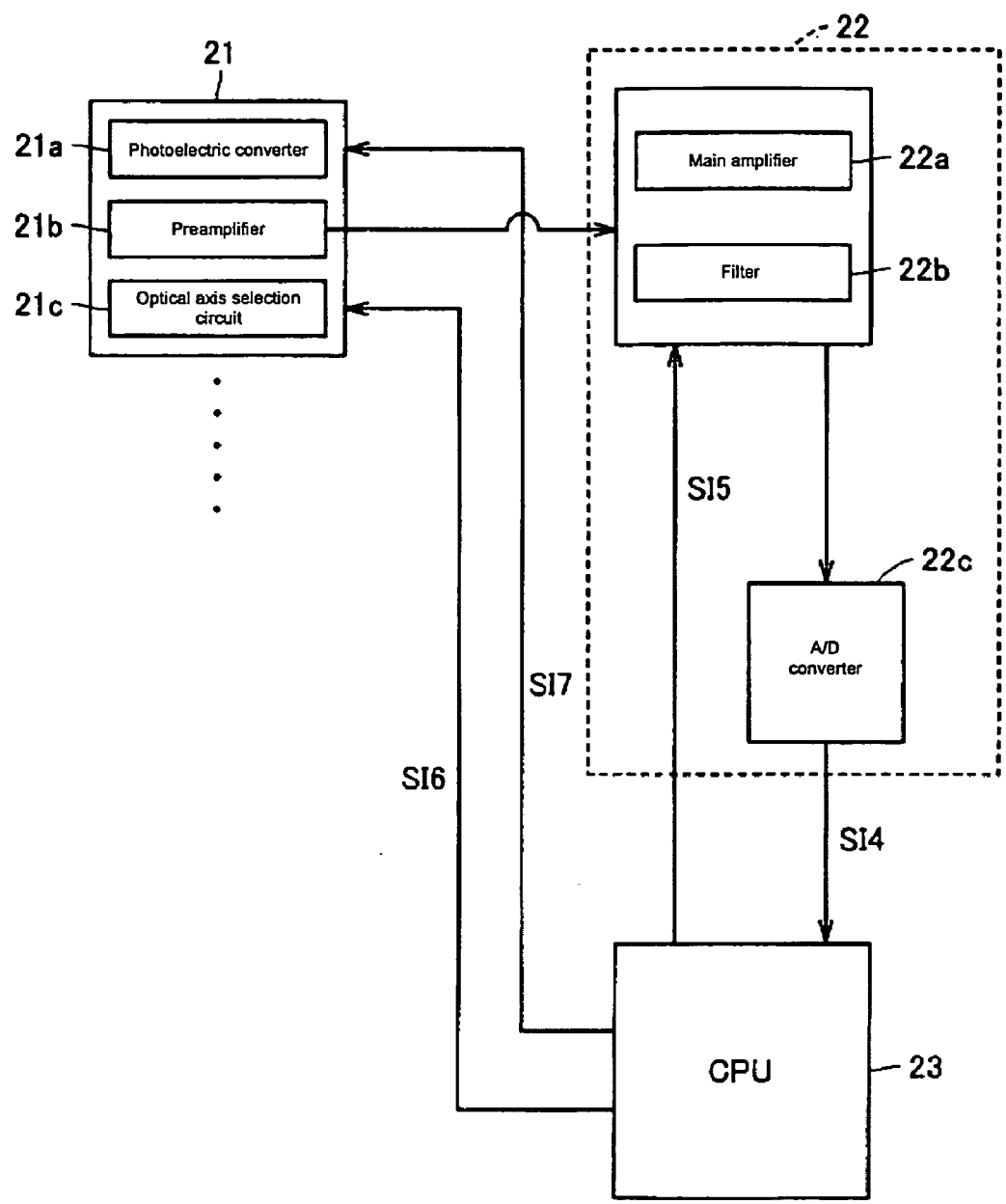
FIG. 3 shows a schematic block diagram of a projector sensor head 2 according to the embodiment of the invention.

FIG. 3 is a schematic block diagram of the light reception sensor head 2 according to the embodiment of the invention.

Referring to FIG. 3, each of the light reception sensor head 2 is mainly constructed by: the photodetector 21 including a photoelectric converter 21a, a preamplifier 21b, and an optical axis selection circuit 21c; the signal processor 22 including a main amplifier 22a for amplifying a light reception signal from the preamplifier 21, a filter 22b for extracting a light reception signal component by detection light from the amplified light reception signal, and an A/D converter 22c for A/D converting the light reception signal subjected to the filtering; and the CPU 23 for performing a detection determination process on the basis of the light reception signal level.

The CPU 23 has an internal memory, and a set value of a threshold value of the light reception signal level used for executing the detection determination process (hereinbelow, also called a light reception determination threshold value) is designated via the external setting device 3 and stored in the internal memory. The light reception determination threshold value and the light reception signal value (SI4) from the signal processor 22 are compared with each other, thereby performing the detection determination process. From the CPU 23, a signal (SI5) for specifying a light reception signal amplification factor in the main amplifier 22a is output. That is, in the embodiment of the invention, the light reception signal amplification factor can be set on the basis of the signal (SI5) in the main amplifier 22a. The light reception signal amplification factor is also set via the external setting device 3 and its set value is stored in the internal memory of the CPU 23. From the CPU 23, an optical axis selection signal (SI6) for selectively driving the light receiving elements in the photoelectric converter 21a via the optical axis selection circuit 21c having a transistor (not shown) and a gate control signal (SI7) instructing validation of a light reception signal (opening of the gate) are output.

Figure 4:
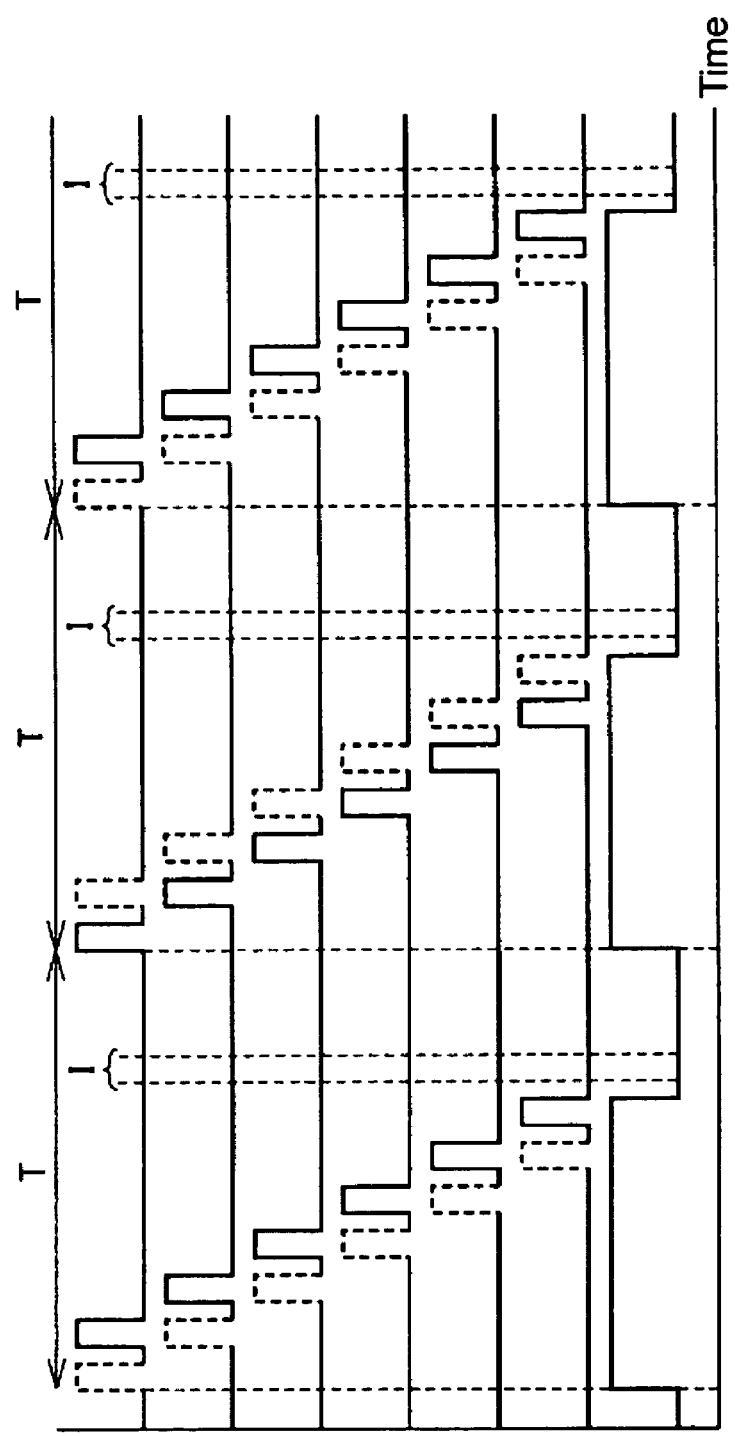
FIG. 4 shows a diagram illustrating light projecting/receiving timings of the multiple-optical-axis photoelectric sensor according to the embodiment of the invention.

FIG. 4 is a diagram illustrating light projecting/receiving timings of the multiple-optical-axis photoelectric sensor according to the embodiment of the invention.

In the embodiment, as an example, light projecting/receiving timings of six projectors and six photodetectors are shown. One pulse-waveform indicates a timing of light projection and light reception. That is, the light projecting/receiving timing corresponds to a light projection/reception period in which a projector and a photodetector execute light projecting/receiving operation.

As shown in FIG. 4, light is sequentially projected from the arranged light projecting elements from one end to the other end, and is sequentially received by the corresponding light receiving elements. Broken lines indicate light reception sampling timings at which only the light receiving elements receive light to execute mutual interference determination which will be described later. The light projecting/receiving operation, that is, light projection and light reception is repeated basically in cycles T. In the embodiment, light reception sampling just before the light projection period and light reception sampling only immediately after the light projection period are repeated alternately every cycle for shortening the response time of the sensors. When importance is placed on the speed of prediction of occurrence of interference irrespective of response speed, light reception can be sampled both immediately before and after the light projection period every cycle. In the diagram, the area "I" sandwiched by the vertical broken lines indicates a period spent for self diagnosis, communication between sensors, and the like. Light projecting/receiving operation periods as periods in which the light projecting/receiving operation is executed in the series of light projecting/receiving operations (all of optical axes) are also shown. In the embodiment, a series of periods in which the light projecting/receiving operation is executed in all of the optical axes will be also called light projecting/receiving cycles.

The whole operations of the multiple-optical-axis photoelectric sensor according to the embodiment of the invention for realizing avoidance of mutual interference will now be described by using the flowchart of FIG. 5.

Figure 5:
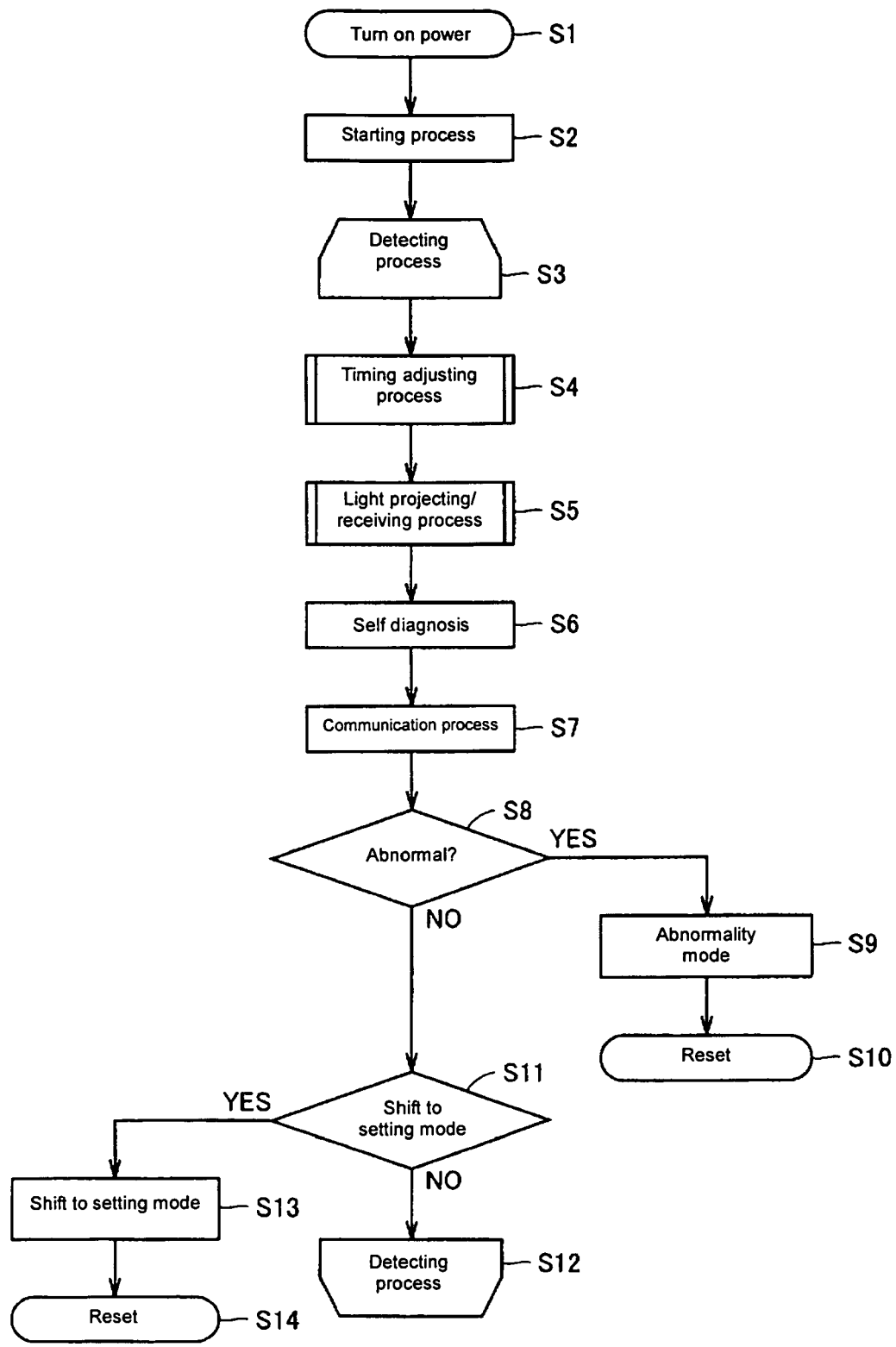
FIG. 5 shows a flowchart of general operation of the multiple-optical-axis photoelectric sensor according to the embodiment for realizing avoidance of mutual interference.

As shown in FIG. 5, when the power of the multiple-optical-axis photoelectric sensor according to the embodiment of the invention is turned on (step S1), first, a starting process (step S2) such as initialization of the sensor head and the memory of the external setting device is executed.

After the starting process is finished, a detecting process (step S3) is executed. The detecting process is executed by repeating a projection/reception light timing adjusting process (step S4), a light projecting/receiving process (step S5), a self diagnosis process (step S6), and a communication process (step S7) for performing communication among the light projection sensor head 1, the light reception sensor head 2, and the external setting device 3 or communication among the light reception sensor head 2 and a light reception sensor head of another multiple-optical-axis photoelectric sensor (in the case where a multiple-optical axis is also provided).

In the embodiment of the invention, after completion of the communication process (step S7), a check is made to see whether there is abnormality or not (step S8) and a check is made to see whether or not the routine shifts to a setting mode for setting a light reception determination threshold value, a light projection amount, a light reception signal amplification factor, and the like is made (step S11). In the check to see whether there is abnormality or not in step S8, the abnormality presence/absence check on the self diagnosis of step S6, the abnormality check on the communication process of step S7, and the check to see whether or not the timing adjustment in step S4 is not performed more than a predetermined number of times in a row (that is, the case where interference cannot be avoided even after repetition of the timing adjustment) are made. When abnormality is found (YES in step S8), the routine shifts to an abnormal mode (step S9) and the operation of the sensor is temporarily stopped.

In the embodiment, when a predetermined setting start signal is supplied from the external setting device 3 (YES in step S11), the routine shifts to the setting mode (step S13).

Figure 6:
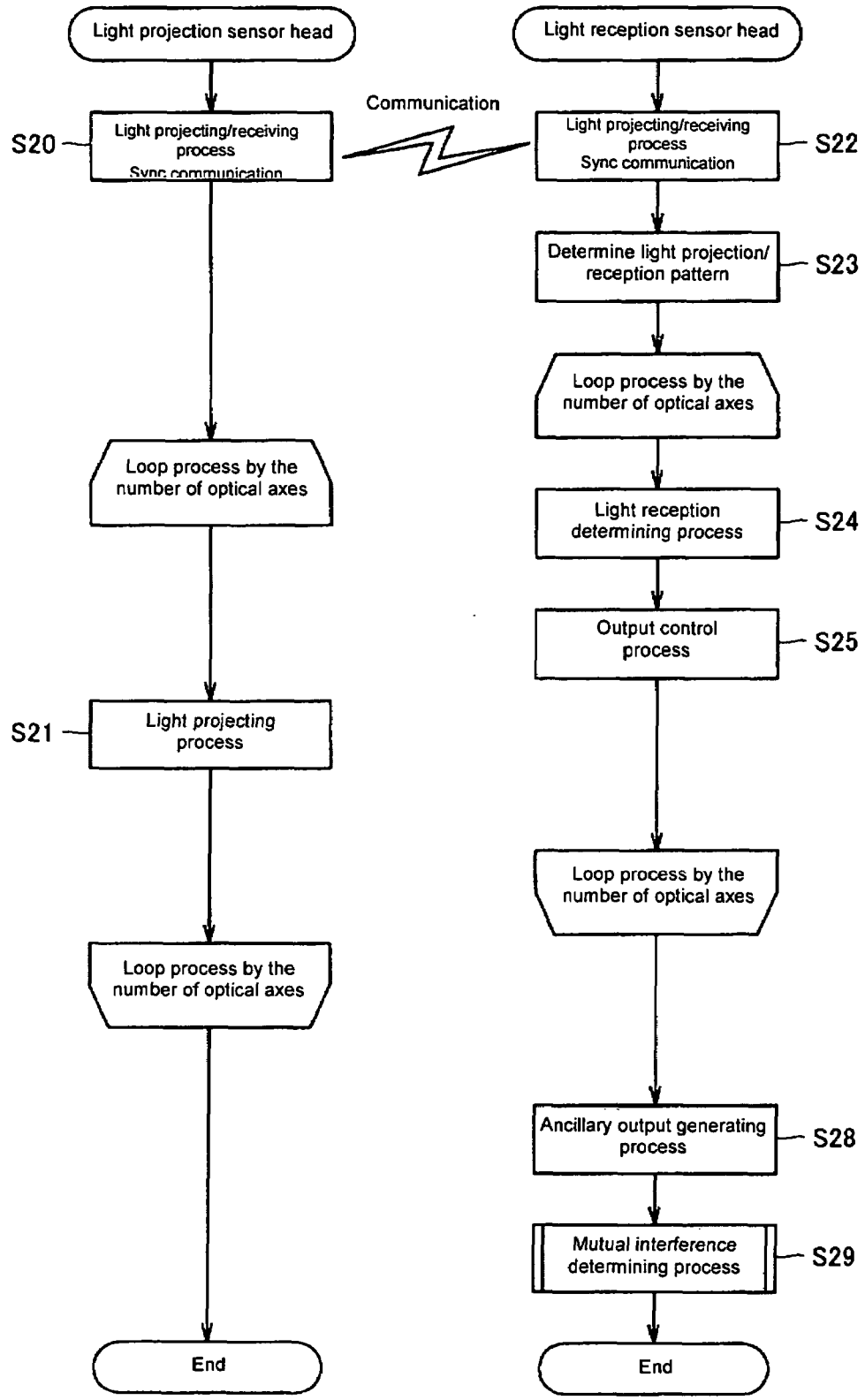
FIG. 6 shows a flowchart illustrating the details of a light projecting/receiving process in step S5.

Next, the details of the light projecting/receiving process shown in step S5 will be described by using the flowchart of FIG. 6. In the diagram, processes (steps S20 and S21) in the light projection sensor head 1 and processes (steps S22 to S29) in the light reception sensor head 2 are shown in parallel.

Although not shown in the flowchart, in the light projecting/receiving process, first, in the light projection sensor head 1, a set value (light projection current data) for specifying a projection light amount is read from the internal memory in the CPU 12. On the other hand, in the light reception sensor head 2, first, setting values of the light reception signal amplification factor and the light reception determination threshold value are read from the internal memory in the CPU 23, thereby determining the signal (SI5) for specifying the light reception signal amplification factor from the CPU 23 shown in FIG. 3 and the light reception determination threshold value.

Subsequently, between the light projection sensor head 1 and the light reception sensor head 2, synchronous communication for achieving synchronization between the light projection sensor head 1 and the light reception sensor head 2 is performed via the communication cable 101 (steps S20 and S22).

In the light reception sensor head 2, a light projection/reception pattern including the timings of mutual interference is determined on the basis of the synchronization communication (step S23).

Subsequently, a loop process is performed by the number of optical axes. In the light projection sensor head 1, by sequentially, selectively driving the projectors 11 on the precondition of the light projection amount determined earlier and the specific number of light projection times, light is projected from the projectors 11 (step S21). The operation is repeated by the number of all of optical axes.

On the other hand, in the light reception sensor head 2, on precondition of the reception light signal amplification factor determined earlier, the light reception sampling gates of the photodetectors 21 are selectively, sequentially opened twice for each (once for on/off state determination and once for interference check). Light reception signals from the photodetectors 21 are sequentially received. The light reception signal is A/D converted by the A/D converter 22c and the resultant digital signal is received by the CPU 23.

The CPU 23 executes a light reception determining process (determination of the presence or absence of light reception in each optical axis) by comparing the received light reception signal and the light reception determination threshold value determined earlier (step S24). More specifically, the determining process is performed by comparing a light reception signal obtained by sampling light reception of once synchronized with light projection from the projector with the light reception determination threshold value. When the light reception signal exceeds the threshold value, light reception is determined. When the light reception signal does not exceed the threshold value, no light reception is determined. Simultaneously, a light reception determination is also made on the light reception signal obtained by the light reception sampling for interference check. The result is used in a mutual interference determining process (step S29) which will be described later.

In the example, the sensor is used for a light curtain. Consequently, when light reception is not recognized (no light reception is determined) in any of the optical axes in the light reception determining process (step S24), in other words, in a light shielded state, a predetermined operation according to the state (for example, generation of a signal for stopping a device to be controlled) is executed (output control process in step S25). In the case where the multiple-optical-axis photoelectric sensor is used as an area sensor, in the light reception determining process (step S24), a predetermined operation (for example, generation of a signal for specifying an object invasion area) is executed on the basis of an optical axis of which light is not recognized (output control process in step S25). Since the output control process performed after the light reception determining process is obvious for the persons skilled in the art, the detailed description will not be given here.

After the loop process shown in steps S24 and S25 is finished, an ancillary output based on the result of the light projection/reception loop process is generated (step S28). The ancillary output is used to notify a high-order device such as PLC of the light reception state of the sensor every plural cycles.

Next, the mutual interference determining process of step S29 is executed.

The mutual interference determining process according to the embodiment of the invention will be described hereinbelow.

Figure 7:
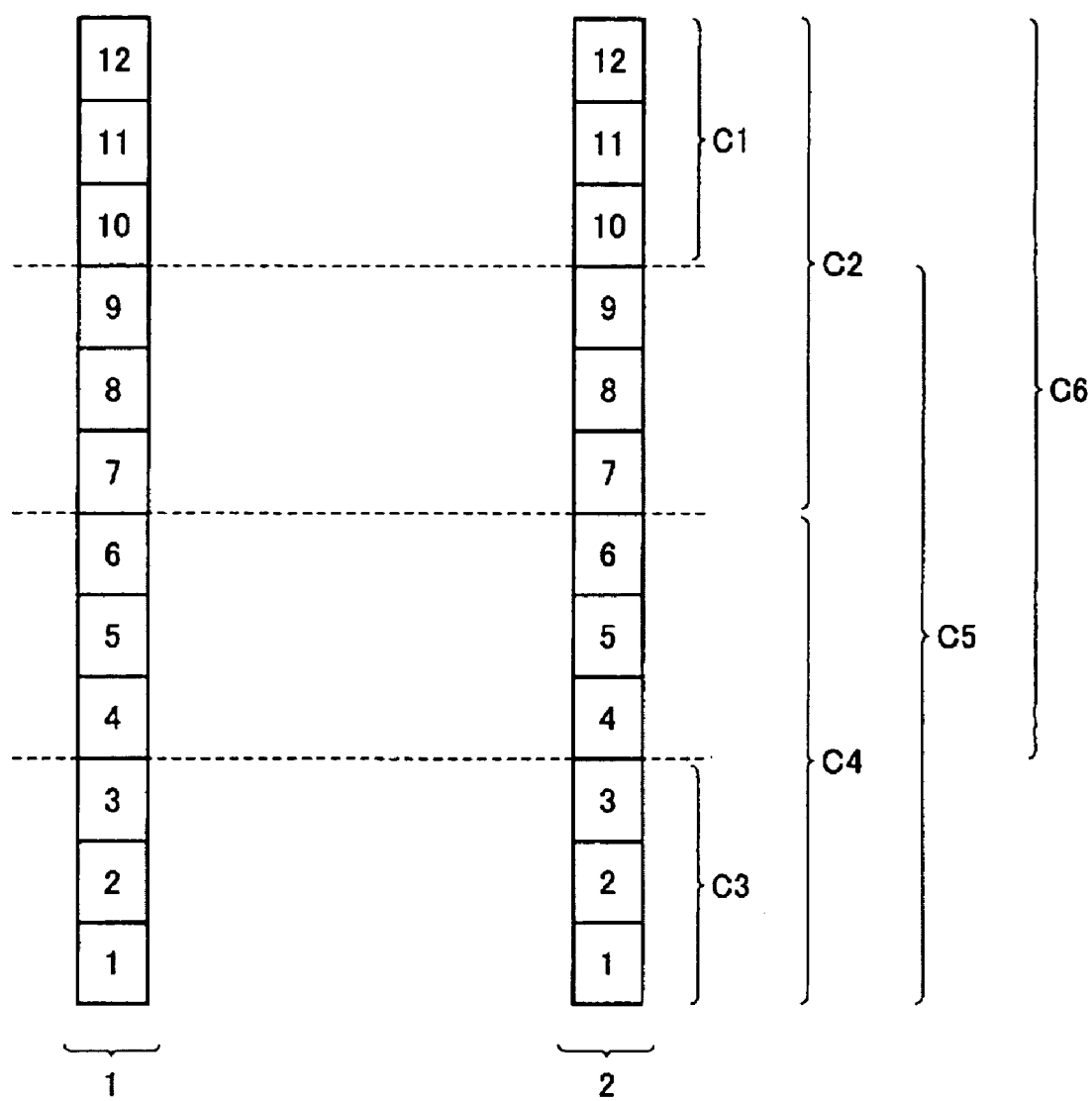
FIG. 7 shows a diagram illustrating a projector and a photodetector of the multiple-optical-axis photoelectric sensor according to the embodiment of the invention.
Figure 8:
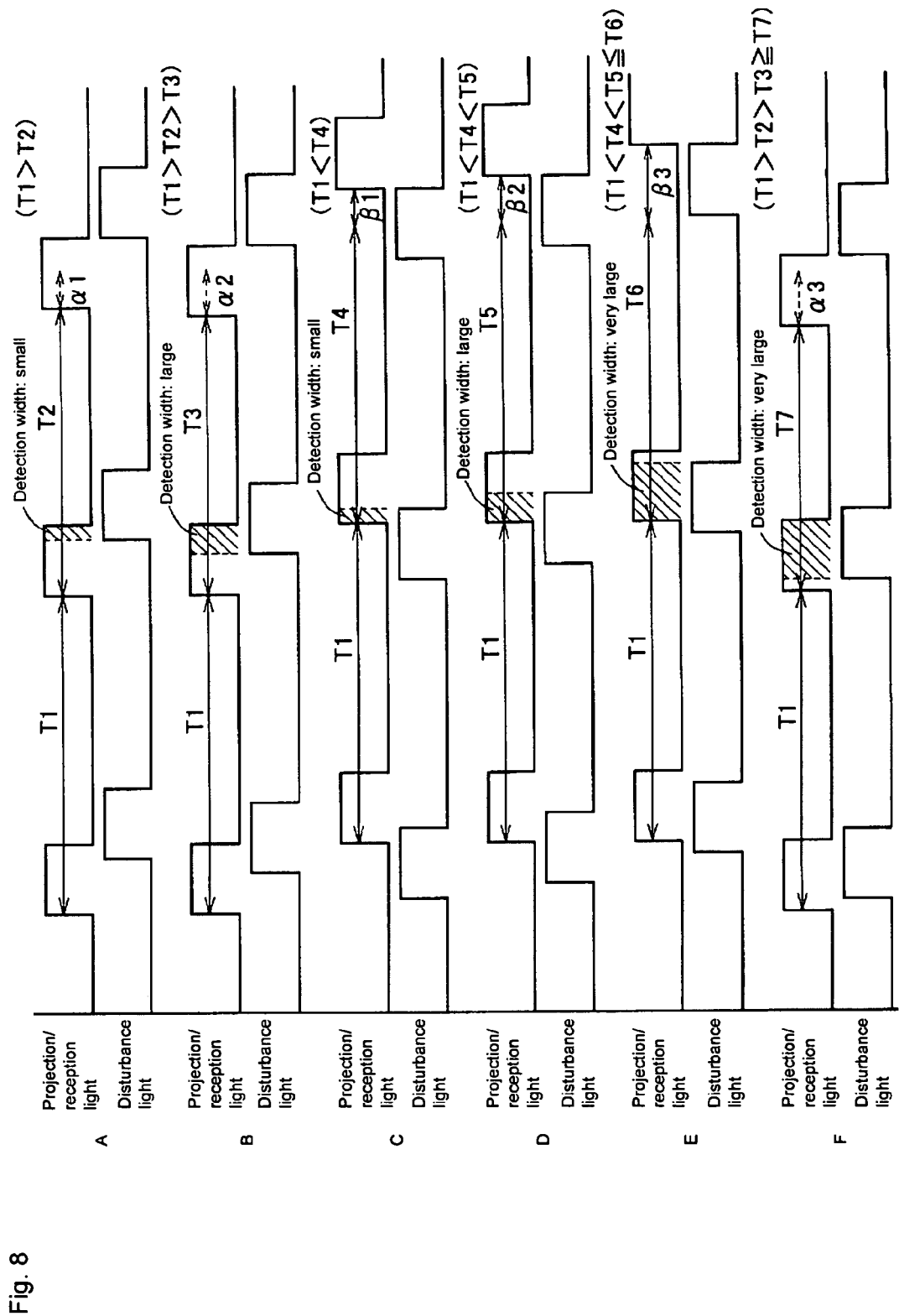
FIG. 8 shows a diagram illustrating shift of a light projecting/receiving cycle in the multiple-optical-axis photoelectric sensor according to the embodiment of the invention.

FIG. 7 is a diagram illustrating the projectors and the photodetectors of the multiple-optical-axis photoelectric sensor according to the embodiment of the invention.

For simplicity, description will be given by using 12 projectors and 12 photodetectors. The projectors and the corresponding photodetectors are numbered as shown in FIG. 7. It is assumed that the projectors and photodetectors sequentially operate from bottom where the number is smallest to top, that is, from one end to the other end. In the embodiment, the 12 projectors and 12 photodetectors are divided into four portions. An area C3 of the first to third projectors and photodetectors, an area C4 of the first to sixth projectors and photodetectors, an area C2 of the seventh to twelfth projectors and photodetectors, an area C1 of the tenth to twelfth projectors and photodetectors, an area C5 of the first to ninth projectors and photodetectors, and an area C6 of the fourth to twelfth projectors and photodetectors are shown.

FIGS. 8A to 8F are diagrams illustrating shifting of light projection/reception cycles in the multiple-optical-axis photoelectric sensor according to the embodiment of the invention. For simplicity, as shown in FIG. 4, the light projecting/receiving operation periods including the light projection/reception timings of all of optical axes are shown.

In the invention, by properly changing the light projection/reception cycle in accordance with a detection range and a place, even when interference is detected (predicated), the interference is avoided properly without stopping the operation so that the operation is continued. In the embodiment, when mutual interference occurs a plurality of times in a row, it is determined that the influence of disturbance light is exerted, and predetermined operation is executed.

The multiple-optical-axis photoelectric sensor of the invention has the configuration for the operation in which, as shown in the diagram, the presence/absence of incident light is determined by performing reception light sampling in a non-projection period immediately before or after a light projection/reception timing as described with reference to FIG. 4, interference is detected.

In FIG. 8A, a light projection/reception cycle T1 of light projection and light reception is shown. Due to the influence of disturbance light, mutual interference occurs in the latter half of the light projecting/receiving operation period. More concretely, when the latter-half period is further divided into a first half portion and a latter half portion, the mutual interference occurs in the latter half portion in the latter-half period. The case where mutual interference is detected by photodetectors of large numbers, specifically, for example, photodetectors in the area C1 in FIG. 7 is shown.

In this case, when light incidence is continuously recognized by the reception light sampling, by advancing the light projection/reception timing of the multiple-optical-axis photoelectric sensor itself as the next sync timing by the amount of a timing period α1 from the predetermined period T1, the light projection/reception timing can be prevented from overlapping with that of another adjacent multiple-optical-axis photoelectric sensor. Concretely, the cycle of the next light projection/reception timing is changed to a light projection/reception cycle T2 (T1>T2). By the operation, the phase of the cycle of the following light projection/reception timing is advanced. Thus, mutual interference can be prevented, and the sensor operation can be continued without being stopped. The cycle T1 of the light projection/reception timing after that is maintained as it is.

In FIG. 8B, due to the influence of disturbance light, mutual interference occurs in the latter-half period of the light projecting/receiving operation period, specifically, from around the middle of the period to the latter half portion. Concretely, the case where mutual interference is detected by, for example, photodetectors having numbers in the latter-half portion in FIG. 7, specifically, photodetectors in the area C2 is shown.

In this case, when light incidence is continuously recognized by the reception light sampling, by advancing the light projection/reception timing of the multiple-optical-axis photoelectric sensor itself as the next sync timing by the amount of a timing period α2 from the predetermined period T1, the light projection/reception timing can be prevented from overlapping with that of another adjacent multiple-optical-axis photoelectric sensor. Concretely, the cycle of the next light projection/reception timing is changed to a light projection/reception cycle T3 (T1>T2>T3). By the operation, the phase of the cycle of the following light projection/reception timing is advanced. Thus, mutual interference can be prevented, and the sensor operation can be continued without being stopped. The cycle T1 of the light projection/reception timing after that is maintained as it is.

In FIG. 8C, the cycle T1 of light projection and light reception is shown. Due to the influence of disturbance light, mutual interference occurs in the first-half period of the light projecting/receiving operation period. More concretely, when the first-half period is further divided into a first-half portion and a latter-half portion, mutual interference occurs in the first-half portion in the first-half period. Concretely, the case where mutual interference is detected by, for example, photodetector having small numbers in FIG. 7, specifically, photodetectors in the area C3 is shown.

In this case, when light incidence is continuously recognized by the reception light sampling, by retarding the light projection/reception timing of the multiple-optical-axis photoelectric sensor itself as the next sync timing by the amount of a timing period β1 from the predetermined period T1, the light projection/reception timing can be prevented from overlapping with that of another adjacent multiple-optical-axis photoelectric sensor. Concretely, the cycle of the next light projection/reception timing is changed to a light projection/reception cycle T4 (T1<T4). By the operation, the phase of the cycle of the following light projection/reception timing is delayed. Thus, mutual interference can be prevented, and the sensor operation can be continued without being stopped. The cycle T1 of the light projection/reception timing after that is maintained as it is.

In FIG. 8D, due to the influence of disturbance light, mutual interference occurs in the first-half period of the light projecting/receiving operation period, specifically, from the first-half portion to a center portion. Concretely, the case where mutual interference is detected by, for example, photodetectors having numbers in the first-half portion in FIG. 7, specifically, photodetectors in the area C4 is shown.

In this case, when light incidence is continuously recognized by the reception light sampling, by delaying the light projection/reception timing of the multiple-optical-axis photoelectric sensor itself as the next sync timing by the amount of a timing period β2 from the predetermined period T1, the light projection/reception timing can be prevented from overlapping with that of another adjacent multiple-optical-axis photoelectric sensor. Concretely, the cycle of the next light projection/reception timing is changed to a light projection/reception cycle T5 (T1<T4<T5). By the operation, the phase of the cycle of the following light projection/reception timing is delayed. Thus, mutual interference can be prevented, and the sensor operation can be continued without being stopped. The cycle T1 of the light projection/reception timing after that is maintained as it is.

In FIG. 8E, due to the influence of disturbance light, mutual interference occurs in the first-half period of the light projecting/receiving operation period, specifically, from the first-half portion to a portion exceeding the center portion. Concretely, the case where mutual interference is detected by, for example, photodetectors in the area C5 in FIG. 7 is shown.

In this case, when light incidence is continuously recognized by the reception light sampling, by largely delaying the light projection/reception timing of the multiple-optical-axis photoelectric sensor itself as the next sync timing by, for example, the amount of a timing period β3 from the predetermined period T1, the light projection/reception timing can be prevented from overlapping with that of another adjacent multiple-optical-axis photoelectric sensor. Concretely, the cycle of the next light projection/reception timing is changed to a cycle T6 (T1<T4<T5≦T6). By the operation, the phase of the cycle of the following light projection/reception timing is delayed. Thus, mutual interference can be prevented, and the sensor operation can be continued without being stopped. The cycle T1 of the light projection/reception timing after that is maintained as it is.

In FIG. 8F, due to the influence of disturbance light, mutual interference occurs from the first-half period of the light projecting/receiving operation period, specifically, from the latter-half portion of the first-half period to the whole latter-half period. Concretely, the case where mutual interference is detected by, for example, photodetectors in the area C6 in FIG. 7 is shown.

In this case, when light incidence is continuously recognized by the reception light sampling, by largely advancing the light projection/reception timing of the multiple-optical-axis photoelectric sensor itself as the next sync timing by, for example, the amount of a timing period α3 from the predetermined period T1, the light projection/reception timing can be prevented from overlapping with that of another adjacent multiple-optical-axis photoelectric sensor. Concretely, the cycle of the next light projection/reception timing is changed to a light projection/reception cycle T7 (T1>T2>T3≧T7). By the operation, the phase of the cycle of the following light projection/reception timing is advanced. Thus, mutual interference can be prevented, and the sensor operation can be continued without being stopped. The cycle T1 of the light projection/reception timing after that is maintained as it is.

The timing period can be set by using, as a reference, the number of optical axes influenced by disturbance light out of all of the optical axes. Concretely, "period (time to the light projecting/receiving process in the next optical axis)×the number of optical axes influenced by disturbance light" can be set or the period of some optical axes can be also set. The larger the number of optical axes influenced by disturbance light is, the wider the timing period is, and the period of changing the start of the next sync timing changes more largely.

Figure 9:
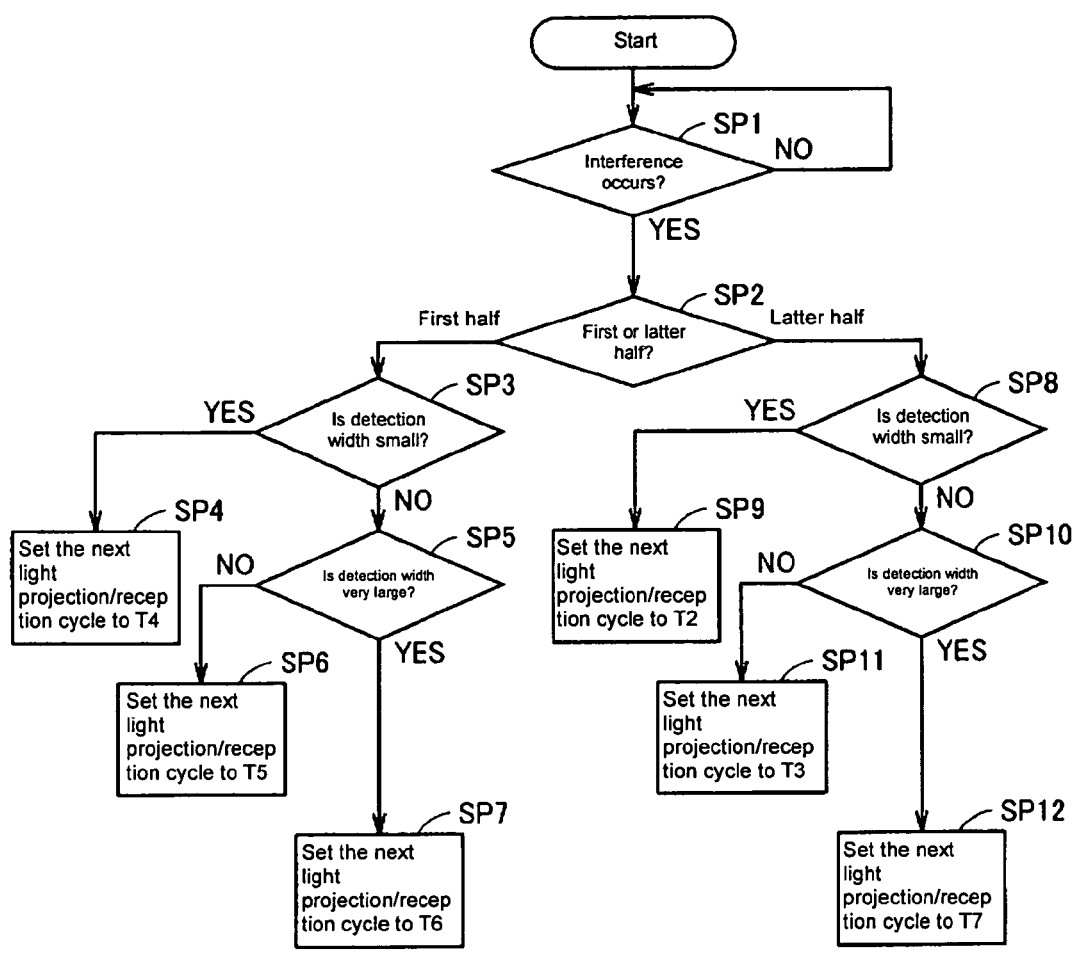
FIG. 9 shows a flowchart showing a mutual interference data process in the embodiment.

FIG. 9 is a flowchart showing a mutual interference data process in the embodiment.

As shown in FIG. 9, first, whether interference occurs or not is determined (step SP1). When it is determined in step SP1 that interference occurs, the routine advances to the next step SP2. In step SP2, the period in which the interference occurs, either the first-half period or the latter-half period of the light projecting/receiving operation period, is determined. In other words, an area in which interference occurs, either the first-half area or the latter-half area of the plurality of photodetectors sequentially operating, is determined. In the case where interference occurs in both of the periods, it is determined that interference occurs in the period in which the interference occurs longer.

In the case where it is determined in step SP2 that interference occurs in the first-half period, whether the detection width is narrow or not, that is, a part in the first-half period in which interference occurs is determined (step SP3). In step S3, when it is determined that the detection width (corresponding to the number of optical axes in which disturbance light is detected) is narrow, specifically, when the first-half period is further divided into the first-half portion and the latter-half portion and it is determined that interference occurs in the first-half portion, the following cycle is set to the light projection/reception cycle T4.

On the other hand, when it is determined in step SP3 that the detection width is not small, the routine advances to step SP5. In step SP5, whether the detection width is very large or not is determined. When the detection width is very large, there is a case where the detection width includes the whole first-half period. In this case, in step SP7, the next cycle is set to the light projection/reception cycle T6. When it is determined that the detection width is not very large, the next cycle is set to the light projection/reception cycle T5 (step SP6).

On the other hand, when it is determined that there is interference in the latter-half period, whether the detection width is small or not, specifically, a part in the latter-half period in which interference occurs is determined (step SP8) When it is determined in step SP8 that the detection width is small, specifically, when the latter-half period is further divided into a first-half portion and a latter-half portion and it is determined that interference occurs in the latter-half portion, the next cycle is set to the light projection/reception period T2. On the other hand, when it is determined in step SP8 that the detection width is not small, the routine advances to step SP10. In step SP10, whether the detection width is very large or not is determined. When the detection width is very large, there is a case where the detection width includes the whole latter-half period. In this case, the next cycle is set to the light projection/reception cycle T7. On the other hand, when it is determined that the detection width is not very large, the next cycle is set to the light projection/reception cycle T3.

As described above, in the embodiment, reception light sampling is performed in a non-projection period immediately before or after a light projection/reception timing in each optical axis. On the basis of the result of light reception immediately before or after the timing, the subsequently light projection/reception cycle is properly shifted to be advanced or delayed. Consequently, even when interference is detected or predicted, the interference can be properly avoided without stopping the operation, and the operation can be continued.

In the embodiment, the state where light projection/reception is performed at a timing slightly before or after the light projection/reception cycle of another multiple-optical-axis photoelectric sensor as a cause of mutual interference, that is, disturbance light can be maintained. Consequently, in the case where a plurality of multiple-optical-axis photoelectric sensors exist, average cycles can be maintained to certain degree in the sensors, and the possibility of occurrence of mutual interference can be lowered. For example, in the case where a plurality of multiple-optical-axis photoelectric sensors change their cycles at random, immediately after a cycle changes in a multiple-optical-axis photoelectric sensor, mutual interference with another multiple-optical-axis photoelectric sensor may occur. However, with the configuration of the embodiment, by making the sensors operate almost in the same cycles with different phases, the possibility of occurrence of mutual interference can be lowered.

In the embodiment, the case where the projectors and the photodetectors arranged as shown in FIG. 7 are divided into four portions and also into a plurality of areas and, on the basis of an area in which disturbance light is incident, the light projection/reception cycle is changed has been described. The invention, however, is not limited to the case. Alternately, it can be designed so that the projectors and photodetectors are further divided into a plurality of areas and a proper light projection/reception cycle among the plurality of light projection/reception cycles is set.

Further, the light projection/reception cycle can be changed on the basis of the position of an optical axis influenced by incident disturbance light. In continuous optical axes at the time of performing the light projecting/receiving operation, that is, in continuous optical axes adjacent to each other, a timing period change amount can be changed for a period according to the number of optical axes in which incidence of disturbance light is continuously recognized.

Second Embodiment

The method of repeating the series of light projecting/receiving operations in all of cycles has been described in the foregoing embodiment. In a second embodiment, a method of performing only a disturbance light process in which the light projecting process is not executed, that is, only mutual interference determining process, or executing another process without performing the light projecting/receiving process in some cycles will be described.

Figure 10:
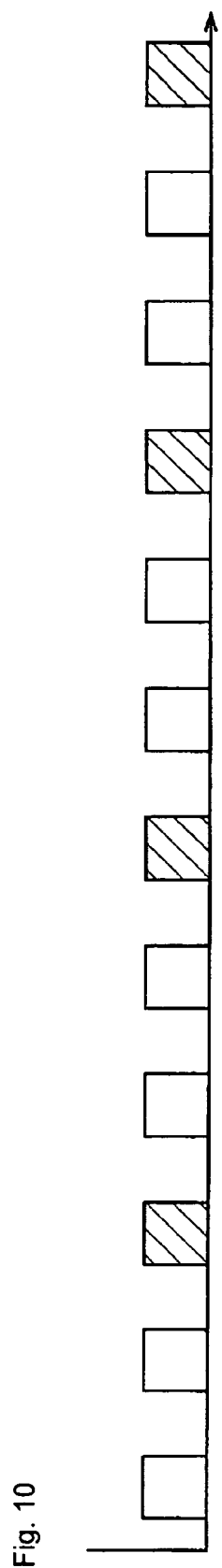
FIG. 10 shows a diagram illustrating a light projection/reception cycle in a second embodiment of the invention.

FIG. 10 is a diagram illustrating a light projection/reception cycle according to the second embodiment of the invention.

Referring to FIG. 10, concretely, it is assumed that the light projecting/receiving process is executed a plurality of times (twice in the embodiment) and, in some cycles, only the disturbance light process, or another process is executed without performing the light projecting/receiving process (hatched portions in FIG. 10). It is assumed that, in cycles in which only the light receiving process is performed, only mutual interference determining process of determining whether the mutual interference occurs or not is executed. As an example, after two cycles of the light projecting/receiving process, one cycle for the mutual interference determining process or another process is provided.

More concretely, the light reception sampling which is performed twice in each optical axis at the light projection/reception timing of the multiple-optical-axis photoelectric sensor illustrated in FIG. 4 is changed to light reception sampling performed once. In normal cycles, the light reception determining process for determining a light reception state is executed. In some cycles, the light reception determining process for determining mutual interference is executed. That is, the light reception sampling for the mutual interference determining process is executed only in the some cycles.

Since the mutual interference determining process is executed according to the method described above with reference to FIGS. 8 and 9, its detailed description will not be repeated.

Although the method of adjusting the light projection/reception cycle in the case where mutual interference occurs in a plurality of continuous cycles has been described in the foregoing embodiment, the light projection/reception cycle can be also adjusted in the case where mutual interference occurs in one cycle.

Generally, the precision of the mutual interference determining process can be increased by executing the process every cycle. However, it can be considered that the possibility of frequent occurrence of mutual interference is not so high in reality.

Therefore, by providing a cycle for the mutual interference determining process at predetermined intervals, that is, in some cycles, importance can be placed on the light reception determining process for determining a light reception state of a sensor to which priority should be given. That is, high-speed and high-precision determining process can be performed.

Although the case of providing some cycles for the mutual interference determining process has been described, some cycles for executing another function in the cycle can be also provided. For example, the area "I" for executing self diagnosis described in FIG. 4 can be assigned as the cycles and executed.

Third Embodiment

Figure 11:
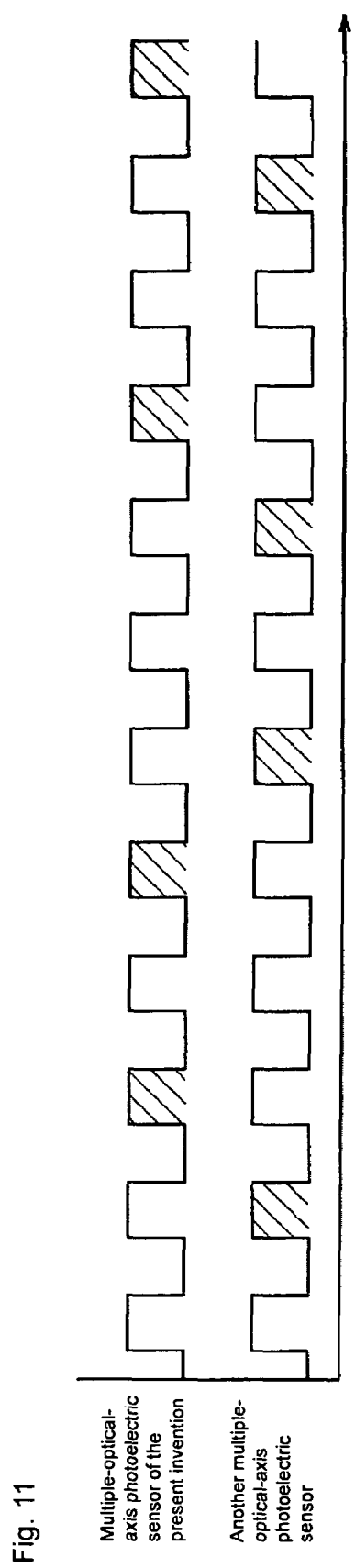
FIG. 11 shows a diagram illustrating a light projection/reception cycle in a third embodiment of the invention.
Figure 12:
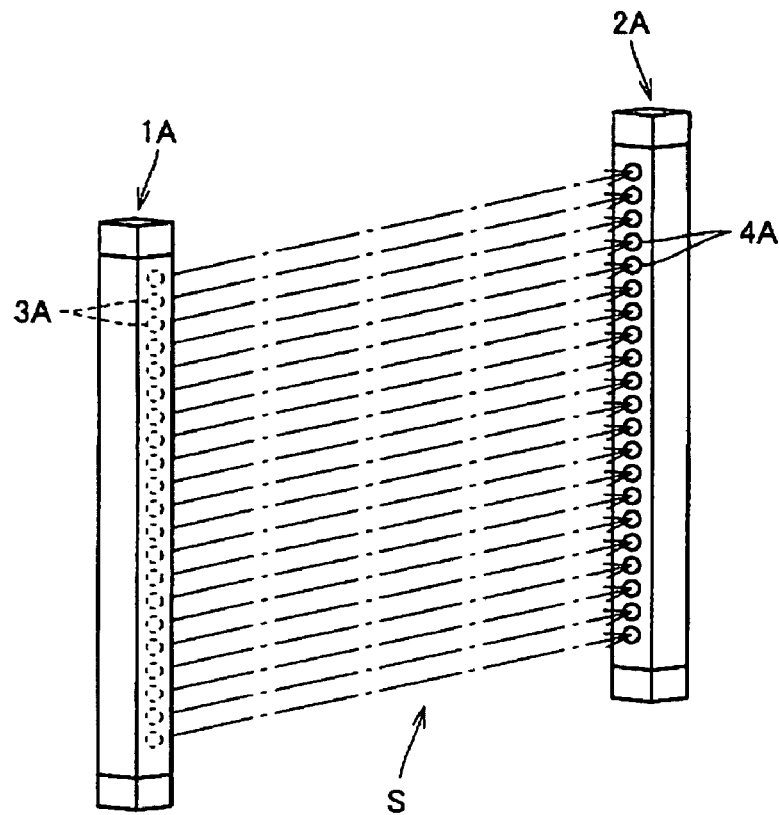
FIG. 12 shows a diagram illustrating a general multiple-optical-axis photoelectric sensor.
Figure 13:
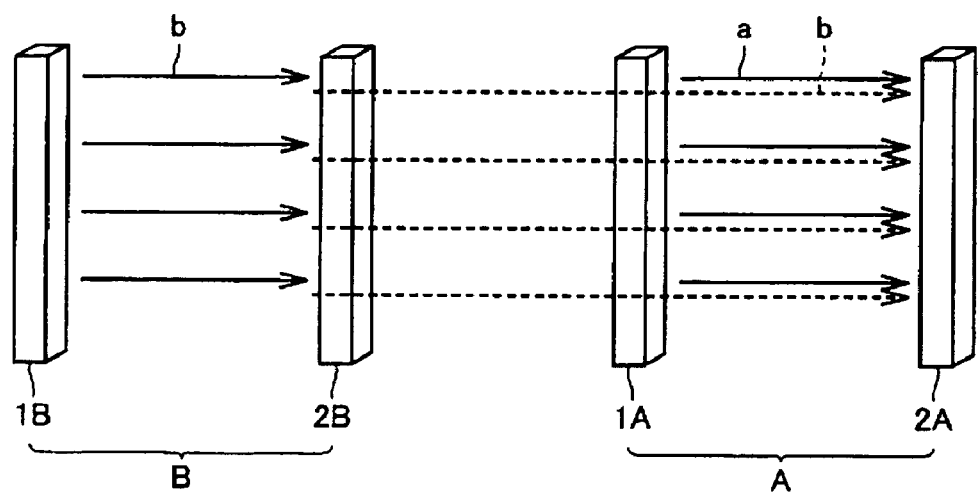
FIG. 13 shows a diagram illustrating an example of mounting a plurality of multiple-optical-axis photoelectric sensors A and B.

FIG. 11 is a diagram illustrating a light projection/reception cycle in a third embodiment of the invention.

With reference to FIG. 11, for example, the light projection/reception cycle in the upper line is that of a multiple-optical-axis photoelectric sensor of the third embodiment, and the light projection/reception cycle in the lower line is that of another multiple-optical-axis photoelectric sensor causing disturbance light.

In the second embodiment, the method of performing only a disturbance light process in which the light projecting process is not executed, that is, only mutual interference determining process, or executing another process without performing the light projecting/receiving process in some cycles has been described. In the third embodiment, particularly, the some cycles are provided at random (hatched portions in FIG. 11).

For example, if there is no cycle in which only the light receiving process is performed, that is, if the light projecting/receiving process is performed in all of cycles, the light projection/reception cycles of all of the neighboring multiple-axis optical photoelectric sensors overlap each other, so that mutual interference occurs in all of cycles.

However, as in the third embodiment, the light projecting/receiving operation is stopped every plural light projection/reception cycles of the multiple-optical-axis photoelectric sensor. The number of plural light projection/reception cycles is set to a random number in unit of plural cycles. Consequently, the ratio of mutual interference occurring between multiple-optical-axis photoelectric sensors can be largely reduced. The method of the third embodiment can be naturally applied to the first and second embodiments.

In the case where shielding of light is confirmed in at least two light projection/reception cycles in a row except for cycles in which the light projecting operation stops, a signal for stopping operation of an external control device can be output by the above-described output control process.

In the case where interference cannot be avoided even after repetition of timing adjustment by changing the light projection/reception cycle on the basis of the mutual interference determining process, that is, in the case where disturbance light is detected at least a predetermined number of times in a row, the possibility of occurrence of erroneous operation is high. Consequently, a signal for stopping operation of an external control device can be output.

The present embodiments are to be considered in all respects as illustrative and not restrictive. The scope of the invention is indicated by the claims rather than the foregoing description and all changes which come within the meaning and range of equivalency of the claims are intended to be embraced therein.

What is claimed is:

1. A multiple-optical-axis photoelectric sensor having a light-projection sensor head in which a plurality of projectors are arranged and a light-reception sensor head in which a plurality of photodetectors are arranged, and performing light projecting/receiving operation while sequentially synchronizing light projection/reception periods from one end to the other end of the projectors and the photodetectors arranged in optical axes in predetermined cycles to monitor the presence or absence of invasion of an object to a predetermined area on the basis of detection light, comprising:

a disturbance light presence/absence determining device that determines whether disturbance light is incident or not by performing reception light sampling with respect to each of the optical axes in which only a photodetector is activated without activating a projector in at least one of a period immediately after the light projection/reception period and a period immediately before the light projection/reception period in every optical axis;

a light incident state determining device that determines an incident state of the disturbance light in the light-reception sensor head, determined by the disturbance light presence/absence determining device; and a cycle changing device that shifts the phase of the following cycle by changing a scheduled next sync timing in accordance with the position of an optical axis in which incidence of the disturbance light is determined by the light incident state determining device.

2. A multiple-optical-axis photoelectric sensor according to claim 1, wherein sequential light projecting operations in the optical axes in the light projection/reception period are stopped once every predetermined plural cycles and, when shielding of light is detected in the light projection/reception period for at least two cycles in a row except for the cycle in which the light projecting operation is stopped, a signal for stopping operation of an external control device is output.

3. A multiple-optical-axis photoelectric sensor according to claim 2, wherein the number of plural cycles is set to a random number in unit of the plural cycles.

4. A multiple-optical-axis photoelectric sensor according to claim 1, wherein the sensor serves as a light curtain that generates a signal for stopping operation of an external control device when invasion of an object to the predetermined area is detected.

5. A multiple-optical-axis photoelectric sensor according to claim 1, wherein the sensor serves as an area sensor that detects a position of invasion of an object in the predetermined area on the basis of at least one optical axis in which shielding of light is detected.

6. A multiple-optical-axis photoelectric sensor according to claim 1, wherein
a monitoring device performs light projecting/receiving operation while synchronizing light projection/reception periods in optical axes and monitors the presence or absence of invasion of an object to a predetermined area on the basis of detection light in a predetermined cycle,
wherein the monitoring device stops light projecting operation once every predetermined plural cycles,
the number of plural cycles is set to a random number in unit of the plural cycles, and
when shielding of light is detected in the light projection/ reception period for at least two cycles in a row except for the cycle in which light projecting operation is stopped, the monitoring device outputs a signal for stopping operation of an external control device.

7. A multiple-optical-axis photoelectric sensor having a light-projection sensor head in which a plurality of projectors are arranged and a light-reception sensor head in which a plurality of photodetectors are arranged, and performing light projecting/receiving operation while sequentially synchronizing light projection/reception periods from one end to the other end of the projectors and the photodetectors arranged in optical axes in predetermined cycles to monitor the presence or absence of invasion of an object to a predetermined area on the basis of detection light, comprising:
a disturbance light presence/absence determining device that determines whether disturbance light is incident or not by performing reception light sampling with respect to each of the optical axes in which only a photodetector is activated without activating a projector in at least one of a period immediately after the light projection/reception period and a period immediately before the light projection/reception period in every optical axis;
a light incident state determining device that determines an incident state of the disturbance light in the light-reception sensor head, determined by the disturbance light presence/absence determining device; and a cycle changing device that shifts the phase of the following cycle by changing start of a scheduled next sync timing in accordance with the number of adjacent optical axes in which incidence of the disturbance light is determined by the light incident state determining device.

8. A multiple-optical-axis photoelectric sensor according to claim 7, wherein the larger the number of optical axes in which incidence of the disturbance light is continuously detected by the incident state determining device is, the more the cycle changing device increases a period for changing start of the scheduled next sync timing.

9. A multiple-optical-axis photoelectric sensor according to claim 7, wherein sequential light projecting operations in the optical axes in the light projection/reception period are stopped once every predetermined plural cycles and, when shielding of light is detected in the light projection/reception period for at least two cycles in a row except for the cycle in which the light projecting operation is stopped, a signal for stopping operation of an external control device is output.

10. A multiple-optical-axis photoelectric sensor according to claim 9, wherein the number of plural cycles is set to a random number in unit of the plural cycles.

11. A multiple-optical-axis photoelectric sensor having a light-projection sensor head in which a plurality of projectors are arranged and a light-reception sensor head in which a plurality of photodetectors are arranged, and performing light projecting/receiving operation while sequentially synchronizing light projection/reception periods from one end to the other end of the projectors and the photodetectors arranged in optical axes in predetermined cycles to monitor the presence or absence of invasion of an object to a predetermined area on the basis of detection light, comprising:
a disturbance light presence/absence determining device that determines whether disturbance light is incident or not by performing reception light sampling with respect to each of the optical axes in which only a photodetector is sequentially activated once per plural times of the predetermined cycle without activating a projector from one end to the other end of the projectors and photodetectors arranged in a period corresponding to a light projection/reception period of the cycle in every optical axis once per plural times of the predetermined cycle;
a light incident state determining device that determines an incident state of the disturbance light in the light-reception sensor head, determined by the disturbance light presence/absence determining device in every optical axis; and
a cycle changing device that shifts the phase of the following cycle by changing a scheduled next sync timing in accordance with the position of an optical axis in which incidence of the disturbance light is determined by the light incident state determining device.

12. A multiple-optical-axis photoelectric sensor according to claim 11, wherein when shielding of light is detected in the light projection/reception period for at least two cycles in a row except for the cycle in which reception light sampling of performing only light reception is performed, a signal for stopping operation of an external control device is output.

13. A multiple-optical-axis photoelectric sensor according to claim 12, wherein the number of plural cycles is set to a random number in unit of the plural cycles.

14. A multiple-optical-axis photoelectric sensor having a light-projection sensor head in which a plurality of projectors are arranged and a light-reception sensor head in which a plurality of photodetectors are arranged, and performing light projecting/receiving operation while sequentially synchronizing light projection/reception periods from one end to the other end of the projectors and the photodetectors arranged in optical axes in predetermined cycles to monitor the presence or absence of invasion of an object to a predetermined area on the basis of detection light, comprising:

a disturbance light presence/absence determining device that determines whether disturbance light is incident or not by performing reception light sampling with respect to each of the optical axes in which only a photodetector is sequentially activated once per plural times of the predetermined cycle without activating a projector from one end to the other end of the projectors and photodetectors arranged once every predetermined plural cycles in every optical axis in a period corresponding to the light projection/reception period of the cycle;

a light incident state determining device that determines an incident state of the disturbance light in the light-reception sensor head in every optical axis, determined by the disturbance light presence/absence determining device; and a cycle changing device that shifts the phase of the following cycle by changing start of a scheduled next sync timing in a period according to the number of adjacent optical axes in which incidence of the disturbance light is determined by the light incident state determining device.

15. A multiple-optical-axis photoelectric sensor according to claim 14, wherein the larger the number of optical axes in which incidence of the disturbance light is continuously detected by the incident state determining device is, the more the cycle changing device increases a period for changing start of the scheduled next sync timing.

16. A multiple-optical-axis photoelectric sensor according to claim 14, wherein when shielding of light is detected in the light projection/reception period for at least two cycles in a row except for the cycle in which reception light sampling of performing only light reception is performed, a signal for stopping operation of an external control device is output.

17. A multiple-optical-axis photoelectric sensor according to claim 16, wherein the number of plural cycles is set to a random number in unit of the plural cycles.

18. A multiple-optical-axis photoelectric sensor having a light-projection sensor head in which a plurality of projectors are arranged and a light-reception sensor head in which a plurality of photodetectors are arranged, and performing light projecting/receiving operation while sequentially synchronizing light projection/reception periods from one end to the other end of the projectors and the photodetectors arranged in optical axes in predetermined cycles to monitor the presence or absence of invasion of an object to a predetermined area on the basis of detection light, comprising:

a disturbance light presence/absence determining device that determines whether disturbance light is incident or not by performing reception light sampling with respect to each of the optical axes in which only a photodetector is activated without activating a projector in at least one of a period immediately after the light projection/reception period and a period immediately before the light projection/reception period in every optical axis;

a light incident state determining device that determines an incident state of the disturbance light in the light-reception sensor head in every optical axis, determined by the disturbance light presence/absence determining device; and a cycle changing device that delays the scheduled next sync timing when the incident state of the disturbance light is recognized in a first-half period of a whole period in which the incident state of the disturbance light is determined on all of optical axes sequentially subjected to the reception light sampling by the light incident state determining device, and advances the scheduled next sync timing when the incident state of the disturbance light is recognized in a latter-half period of the whole period.

19. A multiple-optical-axis photoelectric sensor according to claim 18, wherein the first-half period is divided into a first sub-first-half period and a second sub-second-half period subsequent to the first sub-first-half period, wherein the cycle changing device delays the scheduled next sync timing by a first timing period from a predetermined period when the incident state of the disturbance light is recognized in the first sub-first-half period by the incident state determining device, and delays the scheduled next sync timing by a second timing period longer than the first timing period from the predetermined period when the incident state of the disturbance light is recognized in the first and second sub-first-half periods, the latter-half period is divided into a first sub-latter-half period and a second sub-latter-half period subsequent to the first sub-latter-half period, and the cycle changing device advances the scheduled next sync timing by a third timing period from the predetermined period when the incident state of the disturbance light is recognized in the second sub-latter-half period by the incident state determining device, and advances the scheduled next sync timing by a fourth timing period longer than the third timing period from the predetermined period when the incident state of the disturbance light is recognized in the first and second sub-latter-half periods.

20. A multiple-optical-axis photoelectric sensor according to claim 19, wherein the cycle changing device advances the scheduled next sync timing by a fifth timing period longer than the fourth timing period from the predetermined period when the incident state of the disturbance light is recognized in the second sub-first-half period and the first and second sub-latter-half periods by the incident state determining device, and delays the scheduled next sync timing by a sixth timing period longer than the second timing period from the predetermined period when the incident state of the disturbance light is recognized in the first and second sub-first-half periods and the first sub-latter-half period.

* * * * *